(12) United States Patent
Ooshima et al.

(10) Patent No.: US 6,267,296 B1
(45) Date of Patent: Jul. 31, 2001

(54) TWO-DIMENSIONAL CODE AND METHOD OF OPTICALLY READING THE SAME

(75) Inventors: Tadao Ooshima, Nagoya; Ryosuke Tachi, Oobu, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/310,174

(22) Filed: May 12, 1999

(30) Foreign Application Priority Data

May 12, 1998 (JP) .................................................. 10-128928
May 12, 1998 (JP) .................................................. 10-128929

(51) Int. Cl.⁷ ............................ G06K 19/00; G06K 19/06
(52) U.S. Cl. ............... 235/487; 235/462.08; 235/462.09; 235/494
(58) Field of Search ..................................... 235/494, 487, 235/462.01, 462.08, 462.09, 462.1, 462.11, 462.24, 454

(56) References Cited

U.S. PATENT DOCUMENTS

| | | | |
|---|---|---|---|
| 4,924,078 | * | 5/1990 | Sant 'Anselmo et al. ........... 235/494 |
| 5,153,418 | | 10/1992 | Batterman et al. ................. 235/494 |
| 5,343,031 | * | 8/1994 | Yoshida ................................ 235/494 |
| 5,591,956 | * | 1/1997 | Longacre, Jr. et al. ............. 235/494 |
| 5,691,527 | | 11/1997 | Hara et al. .......................... 235/456 |
| 5,726,435 | | 3/1998 | Hara et al. .......................... 235/294 |
| 5,825,015 | * | 10/1998 | Chan ................................... 235/494 |
| 5,866,895 | * | 2/1999 | Fukuda et al. ..................... 235/494 |
| 5,896,403 | * | 4/1999 | Nagasaki et al. .................. 371/37.1 |
| 6,000,614 | * | 12/1999 | Yang et al. ........................ 235/462.1 |
| 6,102,289 | * | 8/2000 | Gabrielson ...................... 235/462.01 |

FOREIGN PATENT DOCUMENTS

| | | |
|---|---|---|
| 5-19694 | 1/1993 | (JP) . |
| 7-254037 | 10/1995 | (JP) . |
| 8-180125 | 7/1996 | (JP) . |

\* cited by examiner

*Primary Examiner*—Michael G. Lee
*Assistant Examiner*—Daniel St. Cyr
(74) *Attorney, Agent, or Firm*—Pillsbury Winthrop LLP

(57) ABSTRACT

A two-dimensional code made up of a matrix of cells formed with dark and light squares arranged in a pattern carrying an optically readable binary-coded data, and a method of reading such a two-dimensional code. The two-dimensional code features a structure in which at least two data regions are defined in a data field of the matrix. One of the data regions retains a code represented by the cells having a larger size, while the other data region retains a code represented by the cells having a smaller size. The use of cells of different sizes in representing the codes allows the codes to be read correctly under different conditions.

18 Claims, 12 Drawing Sheets

54A, 54B, 54C

OUTPUT FROM CCD CAMERA

OUTPUT FROM BINARY-CODING C.K.T.

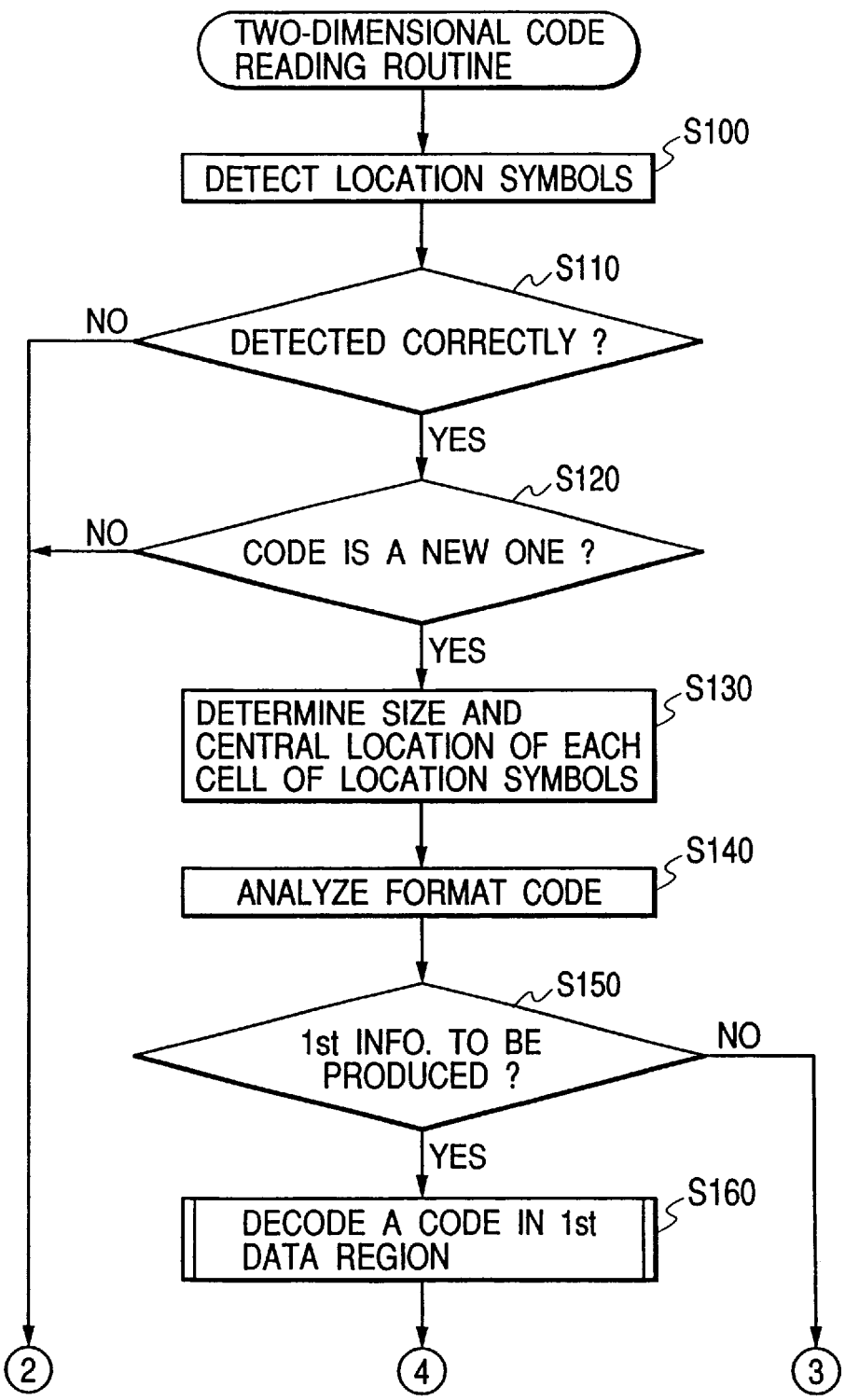

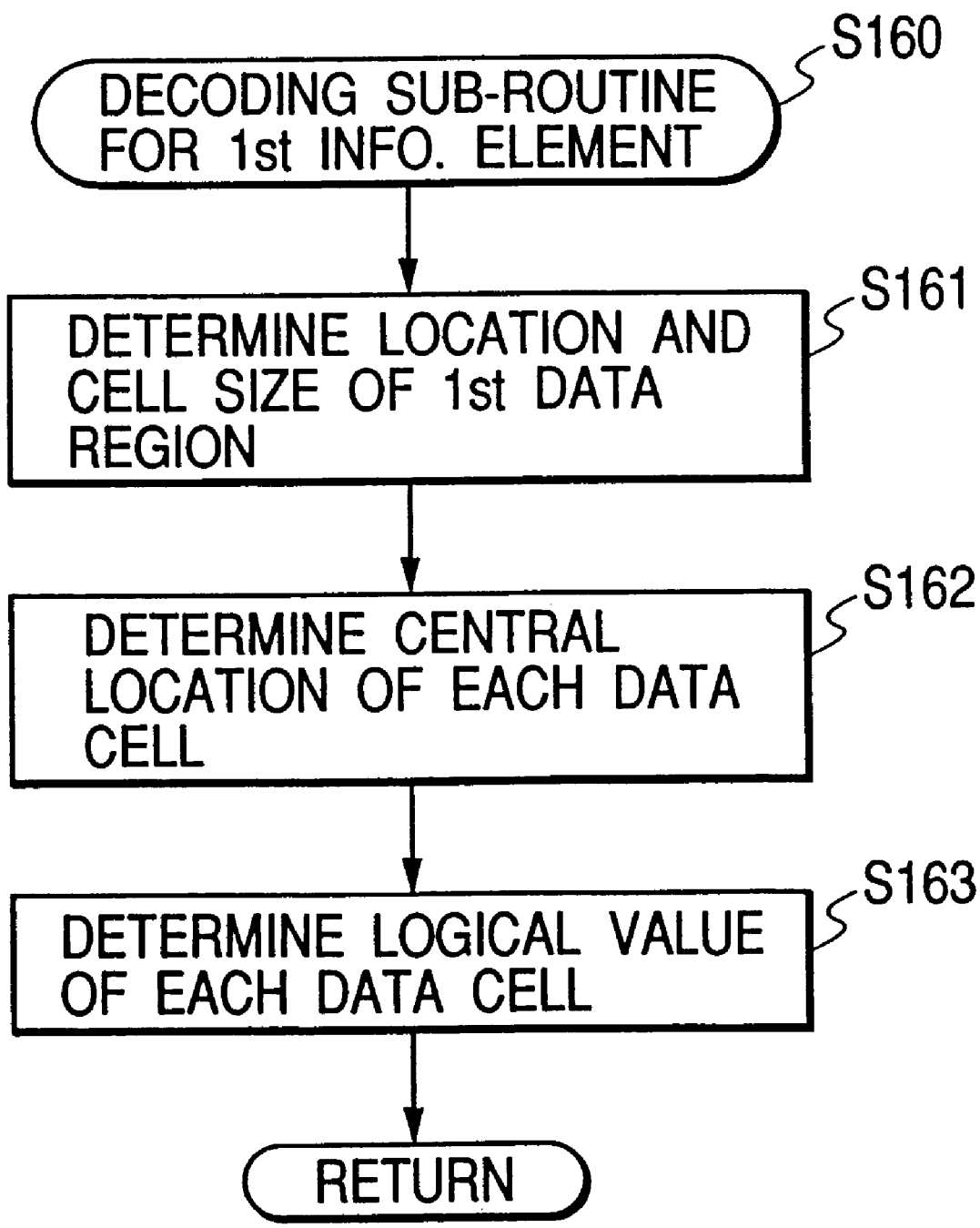

TWO-DIMENSIONAL CODE AND METHOD OF OPTICALLY READING THE SAME

BACKGROUND OF THE INVENTION

1. Technical Field of the Invention

The present invention relates generally to improvements on a two-dimensional code made up of a matrix of data cells carrying optically readable binary-coded information and an optical code reading method of reading such a two-dimensional code.

2. Background Art

U.S. Pat. No. 5,726,435 filed Mar. 10, 1998, assigned to the same assignee as that of this application, teaches a two-dimensional code used in inputting information into a computer.

Typical two-dimensional codes have a two-dimensional spread, as shown in FIG. 1(b), which can carry a large amount of information in a narrow area as compared with a bar code, as shown in FIG. 1(a), but the structure thereof is complex.

FIG. 2 shows one example of two-dimensional codes. The two-dimensional code 500 includes three location symbols 510a, 510b, and 510c and arrays of timing cells 520a and 520b. The location symbols 510a to 510c are used in locating the two-dimensional code 500 and each consist geometrically of a plurality of squares different in size. The arrays of timing cells 520a and 520b are each disposed between adjacent two of the location symbols 510a to 510c and consist of a plurality of white and black cells arranged in a reference pattern that are used as indices of data cells arranged in a data field 530.

The two-dimensional code 500 is made up of a square matrix of n×n cells. Each of the location symbols 510a to 510c consists of a frame-like black square 512 formed with four sides each consisting of 7 cells, a frame-like white square 514 formed with four sides each consisting of 5 cells, and a black square 516 consisting of 3×3 cells formed on the central portion of the white square 514.

When each of the location symbols 510a to 510c is scanned through an optical reader along any line passing through the center thereof, an optical signal pattern which has a brightness component ratio of black:white:black:white:black=1:1:3:1:1 is detected. Thus, when an optical signal pattern having that brightness component ratio is detected during scanning of the two-dimensional code 500, it may be determined as a candidate pattern for any one of the location symbols 510a to 510c. Specifically, when three optical signal patterns each having a brightness component ratio of 1:1:3:1:1 are detected, it may be determined that the two-dimensional code 500 lies on a square area defined by the three optical signal patterns.

The data field 530 consists of data cells (not shown for the brevity of illustration) each formed with a black or white square indicating logical 0 or 1 of a binary-coded data. Two-dimensional coordinates of each data cell are determined in a known algorithm by using the centers of the location symbols 510a to 510c and the timing cells 520a and 520b as indices of the coordinates.

Usually, the size of each cell of such a two-dimensional code is required to be adjusted to individual uses. For example, optically reading a two-dimensional code printed on a label attached to an article being conveyed at high speeds requires increasing the size of each cell. However, for a two-dimensional code printed on an article being conveyed at low speeds or resting, the size of each cell may be small.

For instance, sorting a large number of articles automatically, may be achieved by transporting the articles at high speeds and optically reading two-dimensional codes printed thereon. In contrast, an operator may sort the articles manually by reading the two-dimensional codes using a hand-held optical reader. In this case, it is advisable that the two-dimensional code be made up of the smallest possible cells to reduce the overall size thereof.

In order to meet the above two requirements, it is necessary to make two-dimensional codes of two sizes. This, however, consumes much time of the operator in preparing and attaching two-dimensional code-printed labels to the articles. The two-dimensional code may alternatively be made which consists of two sections: one carrying data to be read out during transportation of the articles at high speeds, and the second carrying data to be read out during transportation of the articles at low speeds. However, the size of each cell needs to be fitted for the high speed transportation, thus resulting in an increased overall size of the two-dimensional codes. This also requires a large-sized optical reader.

SUMMARY OF THE INVENTION

It is therefore a principal object of the present invention to avoid the disadvantages of the prior art.

It is another object of the present invention to provide a simple and small-sized structure of a two-dimensional code containing two or more information codes formed with optical patterns made up of matrixes of cells different in size from each other which are suitable for being read under different conditions, respectively.

It is a further object of the present invention to provide a method of reading a two-dimensional code containing two or more information codes formed with optical patterns made up of matrixes of cells different in size from each other.

According to one aspect of the invention, there is provided a two-dimensional code which comprises: (a) a matrix of cells arranged in a given optically readable pattern which carries information; (b) at least two location symbols arranged at given locations in the matrix, each of the location symbols being made up of a given number of the cells arranged in a pattern to carry location data for specifying a location of the two-dimensional code; and (c) a data field defined in the matrix, including a first and a second data region which carry a first and a second information element, respectively. The first data region is made up of a given number of the cells each having a size identical with that of the cells of the location symbols and defined between the location symbols. The second data region is made up of a given number of the cells each having a size smaller than that of the cells in the first data region.

In the preferred mode of the invention, the second data region includes a plurality of sections which are made up of given numbers of the cells having different sizes, respectively, and which carry information elements, respectively.

The first information element is represented by a code that is of a type specified by the location symbols. The second information element is represented by a code that is of a type different from that of the first information element.

The second data region includes a plurality of sections which are made up of given numbers of the cells having different sizes, respectively, and which carry a plurality of different information elements, respectively, that are represented by codes different in type from each other and the first information element.

A format code is further provided which is arranged in a preselected positional relation to the location symbols and which indicates a format of the two-dimensional code.

The format code is made up of a given number of the cells arranged in a preselected optical pattern.

The format code carries data to specify at least one of a location of each of the first and second data regions, a type of code used in each of the first and second data regions, and a size of the cells in each of the first and second data regions.

The format code may alternatively hold classification information and version information. The classification information represents one of preselected combinations of locations of the first and second data regions, types of code used in the first and second data regions, and sizes of the cells in the first and second data regions. The version information specifies a geometrical pattern of the first data region as a function of a difference in cell size between the first and second data regions.

The format code may be arranged adjacent one of the location symbols.

An auxiliary symbol is further provided which is used in determining locations of the cells in the second data region based on an optical pattern of the auxiliary symbol and locations of the location symbols.

According to the second aspect of the invention, there is provided a two-dimensional code which comprises: (a) a matrix of cells arranged in a given optically readable pattern which carries information; (b) location symbols arranged at given locations in the matrix, the location symbol being made up of a given number of the cells arranged in a pattern to carry location data for specifying a location of the two-dimensional code; and (c) a data field defined in the matrix, including a first and a second data region which carry a first and a second information element, respectively. The first information element is represented by a code that is of a type specified by the location symbols. The second information element is represented by a bar code.

In the preferred mode of the invention, a format code is further provided which is arranged in a preselected positional relation to the location symbol and which indicates a format of the two-dimensional code.

The format code is made up of a given number of the cells arranged in a preselected optical pattern.

The format code carries data to specify at least one of a location of each of the first and second data regions, a type of code used in each of the first and second data regions, and a size of the cells in each of the first and second data regions.

The format code may alternatively hold classification information and version information. The classification information represents one of preselected combinations of locations of the first and second data regions, types of code used in the first and second data regions, and sizes of the cells in the first and second data regions. The version information specifies a geometrical pattern of the first data region as a function of a difference in cell size between the first and second data regions.

The format code may be arranged adjacent one of the location symbols.

An auxiliary symbol is further provided which is used in determining locations of the cells in the second data region based on an optical pattern of the auxiliary symbol and a location of the location symbol.

According to the third aspect of the invention, there is provided a method of reading a two-dimensional code which includes a matrix of cells arranged in a given optically readable pattern which carries information, at least two location symbols arranged at given locations in the matrix, each of the location symbols being made up of a given number of the cells arranged in a pattern to carry location data for specifying a location of the two-dimensional code, and a data field defined in the matrix, including a first and a second data region in which data codes are provided which carry a first and a second information element, respectively, the first data region being made up of a given number of the cells each having a size identical with that of the cells of the location symbols and defined between the location symbols, the second data region being made up of a given number of the cells each having a size smaller than that of the cells in the first data region, comprising the steps of: (a) capturing an image of the two-dimensional code to determine locations of the location symbols in the image; (b) determining a location of each of the cells in at least one of the first and second data regions based on the locations of the location symbols and the size of the cells in the one of the first and second data regions; and (c) decoding a corresponding one of the data codes in the at least one of the first and second data regions to produce a corresponding one of the first and second information elements based on the cells whose locations are determined in the location determining step.

In the preferred mode of the invention, the second data region includes a plurality of sections which are made up of given numbers of the cells having different sizes to represent data codes which carry a plurality of information elements, respectively.

The data code of the first information element is of a type specified by the location symbols. The data code of the second information element is of a type different from that of the first information element. The decoding step decodes the one of the data codes using a given decoding algorithm corresponding to the type of the one of the data codes.

The second data region includes a plurality of sections which are made up of given numbers of the cells having different sizes, respectively, and which carry different information elements, respectively, that are represented by data codes different in type from each other and the first information element.

The two-dimensional code further includes a format code which is arranged in a preselected positional relation to the location symbols and which carries format information on the two-dimensional code representing locations of the first and second data regions and the sizes of the cells in the first and second data regions. The method further comprises the step of locating the format code based on the locations of the location symbols to analyze the format information on the two-dimensional code. The location determining step determines the location of each of the cells based on format information representing locations of the first and second data regions, the sizes of the cells in the first and second data regions, and the types of the data codes used in the first and second data regions. The decoding step decodes the one of the data codes using a given decoding algorithm corresponding to the type of the one of the data codes specified by the format information.

The two-dimensional code further includes an auxiliary symbol which is disposed at a location away from the location symbols. The method further comprises the step of determining the location of the auxiliary symbol in the image based on the locations of the location symbols and an optical pattern of the auxiliary symbol. The location determining step determines the location of each of the cells in the at least one of the first and second data regions based the locations of the auxiliary symbol and the location symbols and the size of the cells in the one of the first and second data regions.

According to the fourth aspect of the invention, there is provided a method of reading a two-dimensional code which includes a matrix of cells arranged in a given optically readable pattern which carries information, location symbols arranged at a given location in the matrix, the location symbol being made up of a given number of the cells arranged in a pattern to carry location data for specifying a location of the two-dimensional code, and a data field defined in the matrix, including a first and a second data region which carry a first and a second information element, respectively, the first information element being represented by a data code that is of a type specified by the location symbols, the second information element being represented by a bar code, comprising the steps of: (a) capturing an image of the two-dimensional code to determine locations of the location symbols in the image; (b) determining a location of each of the cells in at least one of the first and second data regions based on the locations of the location symbols and the size of the cells in the one of the first and second data regions; and (c) decoding a corresponding one of the bar code and the data code in the at least one of the first and second data regions to produce a corresponding one of the first and second information elements based on the cells whose locations are determined in the location determining step.

In the preferred mode of the invention, the two-dimensional code further includes a format code which is arranged in a preselected positional relation to the location symbols and which carries format information on the two-dimensional code representing locations of the first and second data regions and types of the codes used in the first and second data regions. The method further comprises the step of locating the format code based on the locations of the location symbols to analyze the format information on the two-dimensional code. The location determining step determines the location of each of the cells based on the format information. The decoding step specifies a decoding algorithm corresponding to the one of the bar code and the data code and decodes the one of the bar code and the data code using the specified decoding algorithm.

According to the fifth aspect of the invention, there is provided a storage medium storing a program for reading through an optical reader information held in a two-dimensional code which includes a matrix of cells arranged in a given optically readable pattern which carries the information, at least two location symbols arranged at given locations in the matrix, each of the location symbols being made up of a given number of the cells arranged in a pattern to carry location data for specifying a location of the two-dimensional code, and a data field defined in the matrix, including a first and a second data region in which data codes are provided which carry a first and a second information element, respectively, the first data region being made up of a given number of the cells each having a size identical with that of the cells of the location symbols and defined between the location symbols, the second data region being made up of a given number of the cells each having a size smaller than that of the cells in the first data region, the program executing, through a computer installed in the optical reader, the steps of: (a) capturing an image of the two-dimensional code to determine locations of the location symbols in the image; (b) determining a location of each of the cells in at least one of the first and second data regions based on the locations of the location symbols and the size of the cells in the one of the first and second data regions; and (c) decoding a corresponding one of the data codes in the at least one of the first and second data regions to produce a corresponding one of the first and second information elements based on the cells whose locations are determined in the location determining step.

According to the sixth aspect of the invention, there is provided a storage medium storing a program for reading through an optical reader information held in a two-dimensional code which includes a matrix of cells arranged in a given optically readable pattern which carries information, location symbols arranged at given locations in the matrix, the location symbol being made up of a given number of the cells arranged in a pattern to carry location data for specifying a location of the two-dimensional code, and a data field defined in the matrix, including a first and a second data region which carry a first and a second information element, respectively, the first information element being represented by a data code that is of a type specified by the location symbols, the second information element being represented by a bar code, the program executing, through a computer installed in the optical reader, the steps of: (a) capturing an image of the two-dimensional code to determine locations of the location symbols in the image; (b) determining a location of each of the cells in at least one of the first and second data regions based on the locations of the location symbols and the size of the cells in the one of the first and second data regions; and (c) decoding a corresponding one of the bar code and the data code in the at least one of the first and second data regions to produce a corresponding one of the first and second information elements based on the cells whose locations are determined in the location determining step.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIGS. 7(a), 7(b), 8(a), and 8(b) show a program performed by an optical reader to decode a two-dimensional code;

DESCRIPTION OF THE PREFERRED EMBODIMENTS

Figure 1A:
FIG. 1(a) shows a conventional bar code.
Figure 1B:
FIG. 1(b) shows a conventional two-dimensional code.
Figure 2:
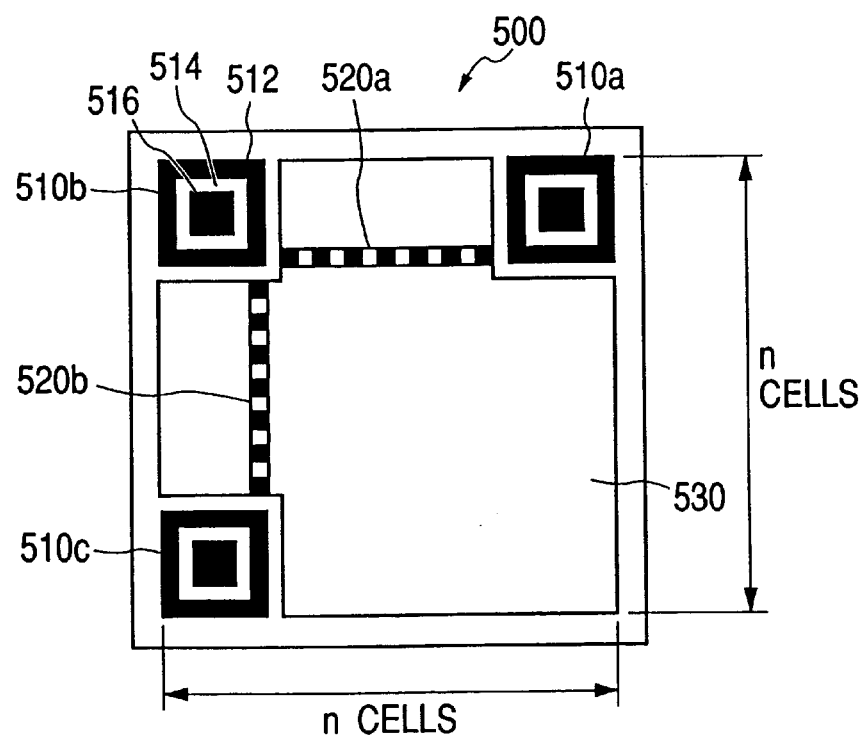
FIG. 2 shows one example of typical two-dimensional codes.
Figure 3A:
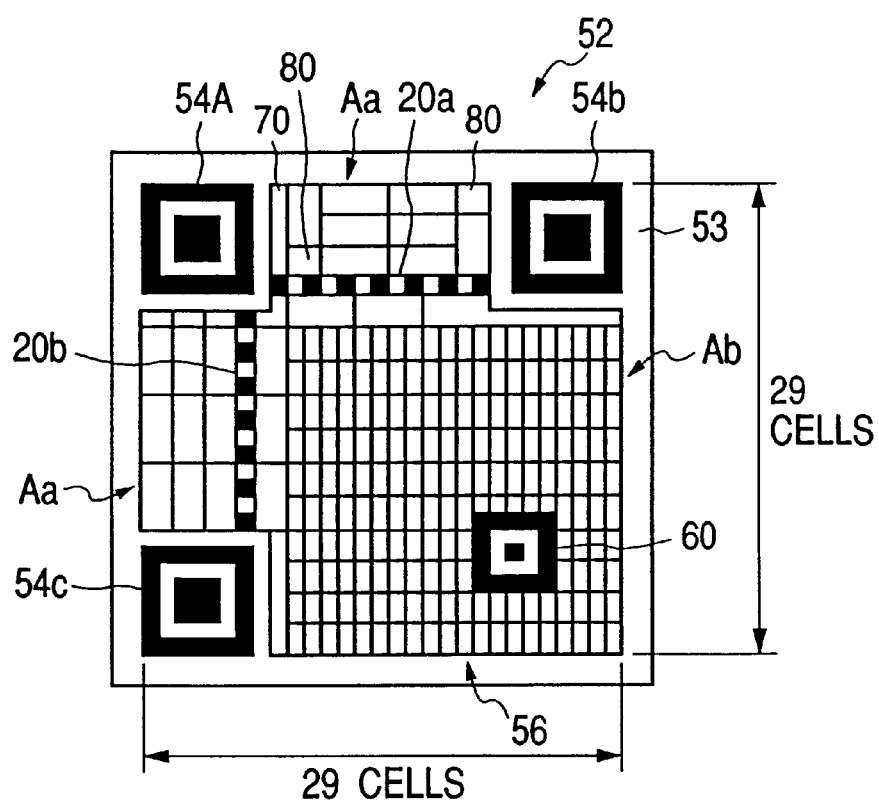
FIG. 3(a) shows a two-dimensional code according to the first embodiment of the invention.

Referring now to the drawings, particularly to FIG. 3(a), there is shown a two-dimensional code 52 according to the first embodiment of the invention.

The two-dimensional code 52 is printed on a white substrate 53 such as paper and includes three location symbols 54A, 54B, and 54C, a data field 56, an auxiliary symbol 60, arrays of timing cells 20a and 20b, and a format code 70.

The data field 56 consists of first and second data regions Aa and Ab. Each of the first data regions Aa is made up of four (2×2) cells each of which is four times greater in size than that of the second data region Ab. In FIG. 3(a), each block of the first and second data regions Aa and Ab represents one cell group consisting of eight (2×4) cells. This is because the grouping in units of 8 cells is suitable for carrying data of one byte if one cell is defined as one bit.

Figure 3B:
FIG. 3(b) shows one of the cell groups making up a first data region of the two-dimensional code in FIG. 3(a)
Figure 3C:
FIG. 3(c) shows one of the cell groups making up a second data region of the two-dimensional code in FIG. 3(a)

FIG. 3(b) illustrates one of the cell groups in the first data regions Aa. Each block represents one of the data cells in the first data regions Aa. Similarly, FIG. 3(c) illustrates one of the cell groups in the second data region Ab. Each block represents one of the data cells in the second data region Ab. In the following discussion, it is assumed that the data cells in each of the first data regions Aa carry a first information element and the data cells in the second data region Ab carry a second information element. The first information elements in the first data regions Aa may be identical or different from each other.

The two-dimensional code 52 is formed with a square matrix of 29×29 cells if one of the data cells in the first data regions Aa is defined as a unit. Of course, if one of the data cells in the second data region Ab is defined as a unit, the two-dimensional code 52 is represented by a square matrix of 58×58 cells, but in the following discussion, one of the data cells in the first data regions Aa will be employed as a unit unless otherwise specified.

Each data cell in the data field 56 is formed with either of two types of squares that are optically different from each other, for example, dark (i.e., black) and light (i.e., white) squares. FIG. 3(a) does not show a pattern of the data field 56 for the brevity of illustration.

The location symbols 54A to 54C are, arranged on three of four corners of the two-dimensional code 56 and made up of cells that are identical in size with those in the first data regions Aa. The location symbols 54A to 54C are used in locating the two-dimensional code 52 and determining orientation thereof. U.S. Pat. No. 5,691,527 issued Nov. 25, 1997, assigned to the same assignee as that of this application, teaches locating a two-dimensional code using location symbols in detail, the disclosure of which is incorporated herein by reference. The type or configuration of the location symbols 54A to 54C depends upon the type of code used in at least one of the first and second data regions Aa and Ab. In other words, the type of code used in at least one of the first and second data regions Aa and Ab may be specified by determining the configuration of the location symbols 54A to 54C. In this embodiment, the so-called QR code (Trademark) is used in each of the first and second regions Aa and Ab. Thus, the use of the QR code in at least one of the first and second data regions Aa and Ab may be known by optically analyzing the configuration of the location symbols 54A to 54C.

Figure 4A:
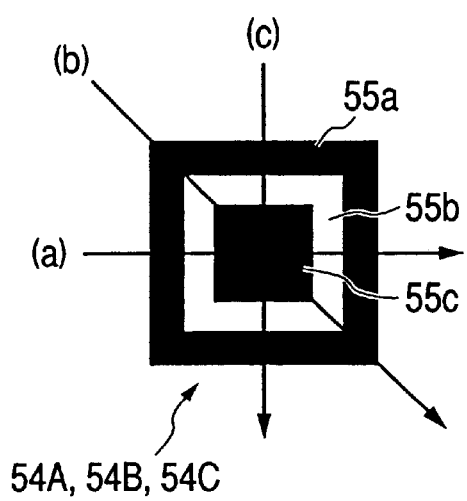
FIG. 4(a) shows scanning lines passing through a location symbol.

Each of the location symbols 54A to 54C, as shown in FIG. 4(a), has an optical pattern including a frame-like black square 55a formed with four sides each consisting of seven (7) cells, a frame-like white square 55b with four sides each consisting of five (5) cells, and a central black square 55c consisting of 3×3 cells.

The first data regions Aa, as clearly shown in FIG. 3(a), lie between the location symbols 54A and 54B and between the location symbols 54A and 54C. The second data region Ab occupies the remaining portion of the two-dimensional code 52.

The auxiliary symbol 60 is printed within the second data region Ab and consists of cells identical in size with those of the first data regions Aa. The auxiliary symbol 60, as shown in FIG. 4(c), has an optical pattern including a frame-like black square 61a formed with four sides each consisting of five (5) cells, a frame-like white square 61b with four sides each consisting of three (3) cells, and a central black square 61c consisting of one (1) cell.

The arrays of timing cells 20a and 20b extend between the location symbols 54A and 54B and between the location symbols 54A and 54C, respectively, and consist of data cells identical in size with those in the first data regions Aa. Each of the arrays of timing cells 20a and 20b consists of white and black squares arranged in an alternate fashion and is used as a reference pattern for locating each data cell. U.S. Pat. No. 5,726,435 issued Mar. 10, 1998, assigned to the same assignee as that of this application, teaches locating each data cell using timing cells, the disclosure of which is incorporated herein by reference.

The format code 70 is printed near the location symbol 54A and has a preselected optical pattern made up of a combination of black and white cells identical in size with those in the first data regions Aa. The format code 70 carries information about at least one of the location of each of the first and second data regions Aa and Ab, the type of code used in each of the first and second data regions Aa and Ab, and the size of data cells in the first and second data regions Aa and Ab. The information carried by the format code 70 may indicate the data region location, the code type, and the cell size indirectly. For instance, the format code 70 may be formed with one of preselected classification numbers each indicating a combination of data region locations, code types, and cell sizes. In this case, these data may be specified in a two-dimensional code reader, as will be described later, by look-up using a table representing the relation between the classification numbers and the combinations of the data region locations, the code types, and the cell sizes.

Figure 5:
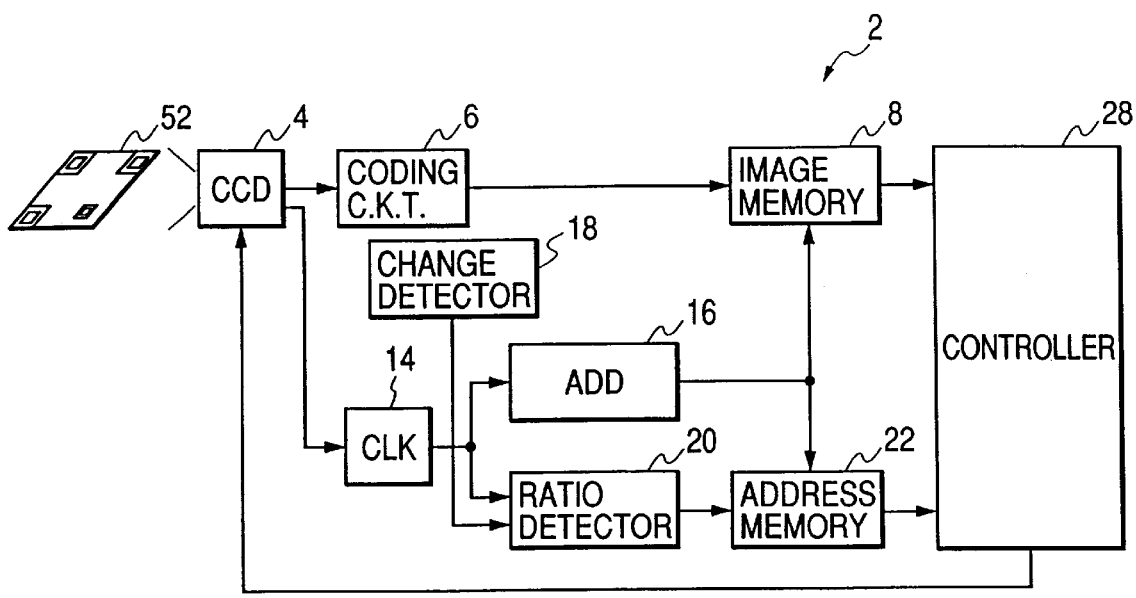
FIG. 5 is a block diagram which shows an optical reader designed to read a two-dimensional code.

FIG. 5 shows an optical reader 2 designed to read the two-dimensional code 52.

The optical reader 2 includes generally an image capturing device 4 such as a CCD camera, a binary coding circuit 6, an image memory 8, a clock generator 14, an address generator 16, a change point detecting circuit 18, a ratio detecting circuit 20, an address memory 22, and a controller 28.

The controller 28 is implemented with a computer consisting of a CPU, a ROM, a RAM, and an I/O circuit and executes a program, as will be discussed later, stored in the ROM to decode the two-dimensional code 52 read out by the CCD camera 4.

The controller 28 performs a reading operation as described below.

Figure 6A:
FIG. 6(a) shows a signal waveform outputted from a CCD camera.
Figure 6B:
FIG. 6(b) shows a signal waveform outputted from a binary coding circuit.

First, the controller 28 issues a command for the CCD camera 4 to capture a two-dimensional image including the two-dimensional code 52. The CCD camera 4 outputs a two-dimensional image data in the form of a multi-level signal, as shown in FIG. 6(a). The binary coding circuit 6 codes the two-dimensional image data into binary numbers or logical signals, as shown in FIG. 6(b), using a threshold value specified by the controller 28.

The clock generator 14 is responsive to synchronous pulses outputted from the CCD 4 to produce clock pulses higher in frequency than pulses of the two-dimensional image data outputted from the CCD 4. The address generator 16 counts the number of clock pulses from the clock generator 14 and provides addresses to the image memory 8. The image memory 8 stores the two-dimensional image data outputted from the binary coding circuit 6 at the address specified by the address generator 16 in units of eight bits.

Every time the signal from the binary coding circuit 6 is switched from logic 0 to 1 or 1 to 0, the change point detecting circuit 18 outputs a pulse signal to the ratio detecting circuit 20. The ratio detecting circuit 20 counts the number of clock pulses outputted from the clock generator 14 for each interval between two consecutive inputs of the pulse signals from the change point detecting circuit 18 to measure the length of a light (logic 1) or a dark portion (logic 0) of the two-dimensional image and determines a ratio of the length of the light portion to the length of the dark portion of the two-dimensional image for detecting an optical pattern indicative of the location symbols 54A to 54C of the two-dimensional code 52.

Figure 4B:
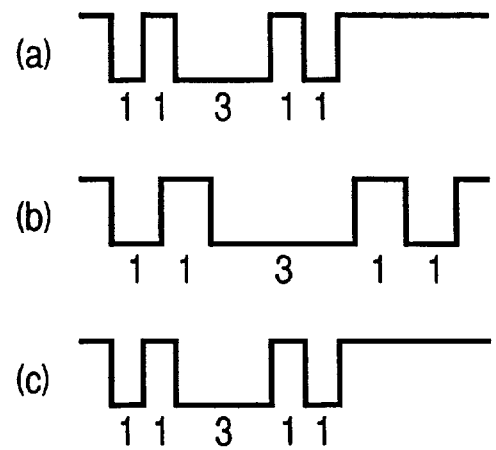
FIG. 4(b) shows binary-coded scanning line signals derived by scanning along the scanning lines shown in FIG. 5(a)
Figure 4C:
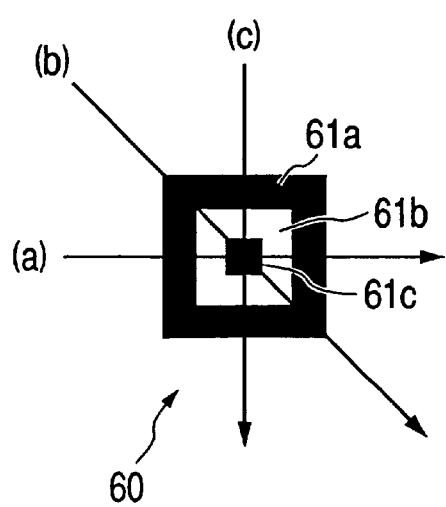
FIG. 4(c) shows scanning lines passing through an auxiliary symbol.

When each of the location symbols 54A to 54C is scanned along three lines (a), (b), and (c), as shown in FIG. 4(a), passing through the center thereof at typical angles, optical signal patterns, as shown in FIG. 4(b), are produced which assume the same brightness component ratio (i.e., the same frequency component ratio). Specifically, the frequency component ratio indicated by the optical signal pattern along each of the scanning lines (a), (b), and (c) is dark:light:dark:light:dark=1:1:3:1:1. Of course, a scanning line passing at an angle intermediate between the scanning lines (a) and (b) or between (b) and (c) also shows the same ratio of 1:1:3:1:1. Additionally, even if each of the location symbols 54A to 54c is arranged on a plane inclined at any angle to a sensor plane of the CCD camera 4, the frequency component ratio indicated by each of the scanning lines (a) to (c) is 1:1:3:1:1.

The pulse signals (a), (b), and (c) shown in FIG. 4(b) represent signals which are picked up along the scanning lines (a), (b), and (c) in FIG. 4(a) and binary-coded by the binary coding circuit 6.

When a frequency component ratio of 1:1:3:1:1 is detected in the above manner, the ratio detecting circuit 20 latches one of addresses of the image memory 8 generated by the address generator 16 and stores it to the address memory 22. Therefore, when the CCD camera 4 has produced two-dimensional image data of one frame, the image data binary-coded by the binary coding circuit 6 is stored in the image memory 8, and addresses of some of or all of the location symbols 54A to 54C which were successful in being captured by the CCD camera 4 are stored in the address memory 22.

After a two-dimensional image of one frame is produced completely from the CCD camera 4, the controller 28 begins performing a two-dimensional code reading operation, as will be discussed later, based on data stored in the image memory 8 and the address memory 22. Upon completion of this operation, the controller 28 issues a command for the CCD camera 4 to capture a two-dimensional image of a subsequent frame.

FIGS. 7(a) to 8(b) show a two-dimensional code reading program performed by the controller 28 after an image of the two-dimensional code 52 of one frame and addresses of the location symbols 54A to 54C are stored in the image memory 8 and the address memory 22, respectively. This program may be preinstalled in the ROM of the controller 28 or installed as necessary by loading a mechanically readable storage medium such as a floppy disk, a magneto-optical disk, a CD-ROM, or a hard disk which stores therein the program.

After entering the program, the routine proceeds to step 100 wherein the controller 28 detects the location symbols 54A to 54C. Specifically, the controller 28 gains access to the image memory 8 and the address memory 22 to determine whether the three location symbols 54A to 54C are all in place or not and to determine the configuration and central location of each of the location symbols 54A to 54C in a two-dimensional image captured by the CCD camera 4 in the following manner.

First, it is determined whether it is possible to group addresses stored in the address memory 22 under three locations at which the location symbols 54A to 54c are to lie in the two-dimensional image or not by looking up the image memory 8 and the address memory 22. The shape and central location of each of the location symbols 54A to 54C is determined based on a binary pattern (i.e., a white/black pattern) of the image stored in the image memory 8 to determine whether the location symbols 54A to 54C lie at three of four corners of the two-dimensional code 52, as shown in FIG. 3(a), or not.

The routine proceeds to step 110 wherein it is determined whether the three location symbols 54A to 54C have been detected correctly or not based on results of the determination in step 100. If a NO answer is obtained, then the routine proceeds directly to step 280 in FIG. 8(a) to issue a command for the CCD camera 4 to capture an image of a subsequent frame.

If a YES answer is obtained in step 110, then the routine proceeds to step 120 wherein it is determined whether the two-dimensional code 52 detected in this program execution cycle is a new one or not. This determination is made to prevent the two-dimensional code 52 which continues to be analyzed from a previous program execution cycle from being incorrectly identified as another one captured for the first time in this program execution cycle by the CCD camera 4. For example, when the three location symbols 54A to 54C have already been detected correctly, and the contents of the two-dimensional code 52 have also been read correctly one or several program execution cycles earlier, it is determined that the two-dimensional code 52 being analyzed in this program execution cycle is the same as that analyzed in the previous program execution cycle. In this case, a NO answer is obtained in step 120, and the routine proceeds to step 280 in FIG. 8(a).

If a YES answer is obtained in step 120, then the routine proceeds to step 130 wherein the size and central location of each cell of the location symbols 54A to 54C are determined using the configuration of the location symbols 54A to 54C in the following manner.

The outer black frame 55a of each of the location symbols 54A to 54C, as clearly shown in FIG. 4(a), has the width equivalent to one cell. Similarly, the inner white frame 55b has the width equivalent to one cell. The central black square 55c has the width equivalent to three cells. The size, i.e., the length and width of each cell of the location symbols 54A to 54C are, therefore, determined by dividing the overall length and width of an image of one of the location symbols 54A to 54C stored in the image memory 8 by seven (7). Next, the position of each cell in the location symbols 54A to 54C is determined using the length and width of the cell calculated in the above manner.

The routine proceeds to step 140 wherein the format code 70 is detected based on the position of the location symbol 54A. The format code 70 is, as shown in FIG. 3(a), parallel to and at an interval equivalent to one cell away from one of four sides of the outer black frame 55a of the location symbol 54A opposed to the location symbol 54B. Using this positional relation, the format code 70 is detected.

The routine proceeds to step 150 wherein it is determined whether it is required to decode the first information element contained in each of the first data regions Aa of the data field 56 or not. If a YES answer is obtained, then the routine proceeds to step 160 wherein a code in each of the first data regions Aa is decoded according to a sub-program shown in FIG. 7(b).

First, in step 161, the location of each of the first data regions Aa in the two-dimensional code 52 and the size of the data cells in each of the first data regions Aa are determined by analyzing the format code 70 detected in step 140 which represents, as described above, one of classification numbers each indicating one of preselected combinations of locations of the first and second data regions Aa and Ab in the two-dimensional code 52, the types of code used in the first and second data regions Aa and Ab, and the cell sizes in the first and second data regions Aa and Ab. The optical reader 2 installs in the RAM of the controller 28 a table representing the relation between the classification numbers and the combinations of the data region locations, the code types, and the cell sizes. The operation in step 161 is thus, performed by look-up using the table stored in the controller 28.

The routine proceeds to step 162 wherein the location of the center of each data cell in each of the first data regions Aa is determined based on the location of a corresponding one of the first data regions Aa and the size of the data cells in the first data regions Aa determined in step 161 and the shape and central location of each of the location symbols 54A to 54C determined in step 130 of FIG. 7(a).

The routine proceeds to step 163 wherein binary numbers indicated by pixels lying at the centers of the data cells in the first data regions Aa are read to determine logical values of the data cells, thereby decoding the code in each of the first data regions Aa to produce the first information element.

The decoding in step 163 may also be performed as needed using the following information read out of the format code 70. The first data region Aa is, as already described, made up of cell groups each consisting of 2×4 cells. The cell groups are not always uniform in orientation. In the case shown in FIG. 3(a), two of the cell groups between the location symbols 54A and 54B have the length oriented vertically as viewed in the drawing, while all the cell groups between the location symbols 54A and 54C have the length oriented vertically. Data on the orientations of the cell groups in the first data region Aa between the location symbols 54A and 54B may, thus, be held in the format code 70 for use in decoding the first information element in the first data region Aa between the location symbols 54A and 54B.

Figure 8A:
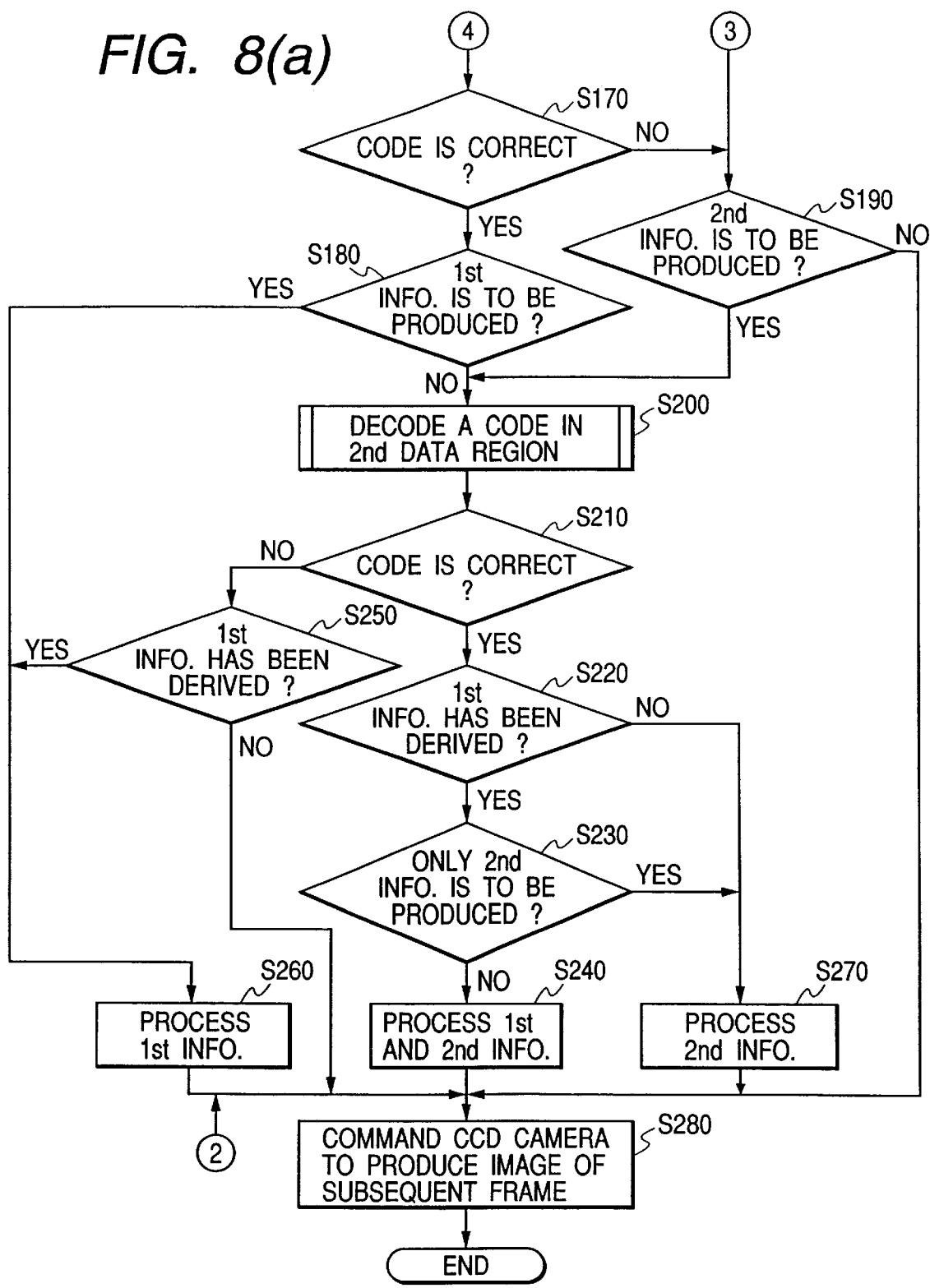

After step 160, the routine proceeds to step 170 in FIG. 8(a) wherein it is determined whether the contents of the code in the first data regions Aa are correct or not. For instance, this determination is made by determining whether the numbers of detected black and white cells agree with predetermined numbers, respectively, or not or whether the result of an operation on the code in each of the first data regions Aa according to a given algorithm agrees with a check code provided in a preselected location of the two-dimensional code 52 or not.

If a YES answer is obtained in step 170, then the routine proceeds to step 180 wherein the first information element in each of the first data regions Aa is to be outputted or not. If a NO answer is obtained, then the routine proceeds to step 200, as will be described later in detail. Alternatively, if a YES answer is obtained, then the routine proceeds to step 260 wherein the contents of the code in each of the first data regions Aa, i.e., the first information element, are outputted to, for example, another device such as a host computer or stored in a memory; a given operation specified by the first information element is executed; or a command specified by the first information element is outputted, which will be referred to below as a code content output operation. The routine proceeds to step 280 to issue a command for the CCD camera 4 to capture an image of a subsequent frame.

If a NO answer is obtained in step 170, then the routine proceeds to step 190. Additionally, if a NO answer is obtained in step 150 of FIG. 7(a) meaning that the first information element, i.e., the code in each of the first data regions Aa is not to be decoded, then the routine proceeds to step 190. In step 190, it is determined whether the second information element, i.e., a code in the second data region Ab, is to be decoded or not. If a NO answer is obtained, then the routine proceeds directly to step 280.

Figure 8B:
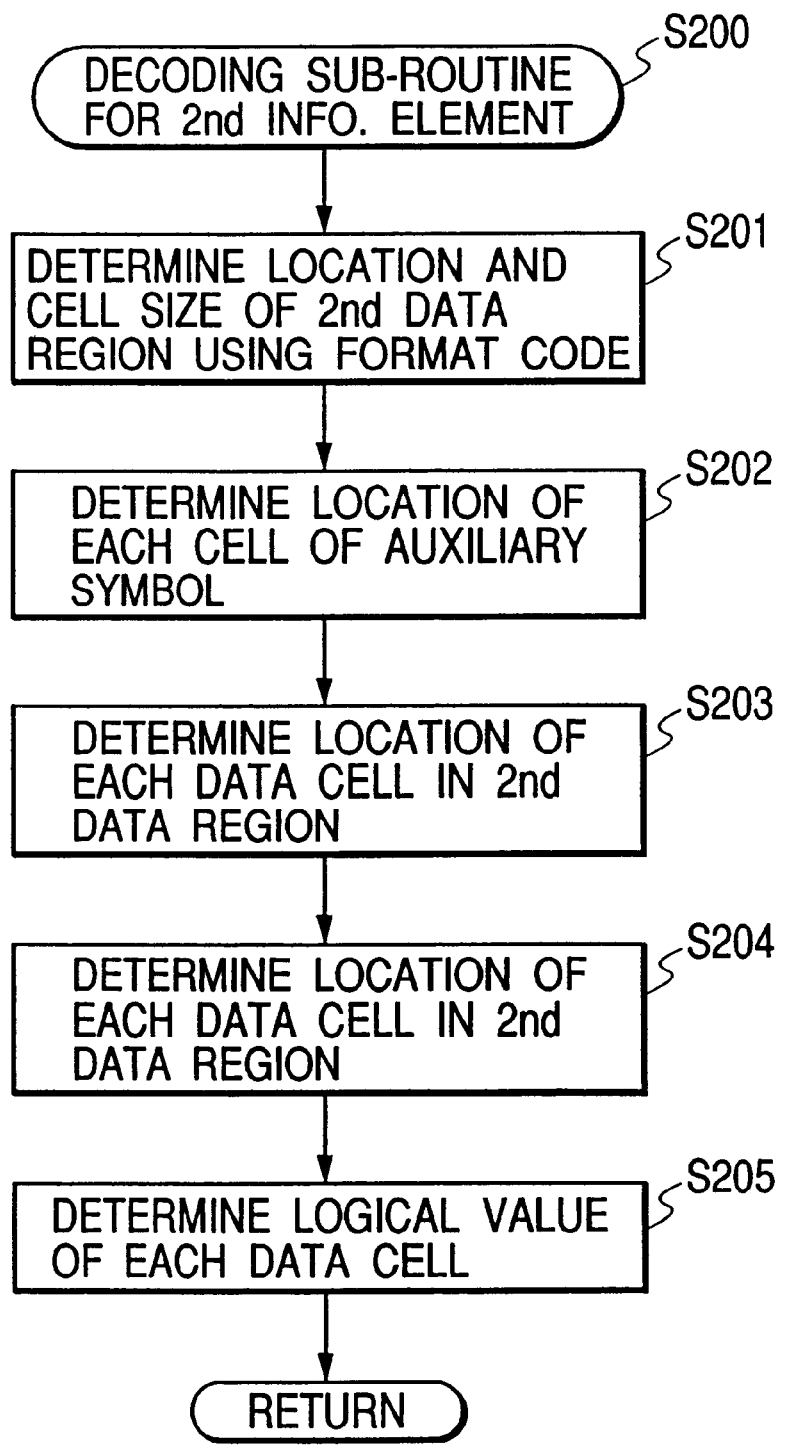

Alternatively, if a YES answer is obtained in step 190, then the routine proceeds to step 200 wherein the code in the second data region Ab is decoded according to a sub-program shown in FIG. 8(b).

First, in step 201, the location of the second data region Ab in the two-dimensional code 52 and the size of the data cells in the second data region Aa are determined by analyzing the format code 70 detected in step 140 in the same manner as that used in step 161 of FIG. 7(b).

Figure 4D:
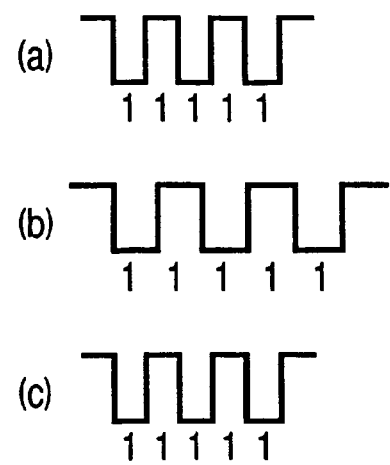
FIG. 4(d) shows binary-coded scanning line signals derived by scanning along the scanning lines shown in FIG. 4(c)

The routine proceeds to step 202 wherein the central location of the auxiliary symbol 60 is estimated mathematically based on predetermined positional relations to the location symbols 54A to 54C and the size and central location of each cell of the location symbols 54A to 54C derived in step 130. Next, an image around the estimated central location is scanned to find an optical pattern, as shown in FIG. 4(c), i.e., a frequency component ratio of the auxiliary symbol 60, thereby determining the configuration and actual central location of the auxiliary symbol 60. Note that the frequency component ratios of the auxiliary symbol 60 when scanned along the lines (a), (b), and (c), as shown in FIG. 4(c), passing through the center thereof are, as shown in FIG. 4(d), identical with each other: dark:light:dark:light:dark=1:1:1:1:1.

The routine proceeds to step 203 wherein central locations of the cells making up the auxiliary symbol 60 are determined based on the configuration and the central location of the auxiliary symbol 60 determined in step 202.

The routine proceeds to step 204 wherein the central locations of the data cells in the second data region Ab are determined based on the above geometrical and positional data on the auxiliary symbol 60 in addition to the size and the central locations of the cells of the location symbols 54A to 54C determined in step 130.

The routine proceeds to step 205 wherein binary numbers indicated by pixels lying at the centers of the data cells in the second data region Ab are read to determine logical values of the data cells, thereby decoding the code in the second data region Ab to produce the second information element.

After step 200, the routine proceeds to step 210 wherein it is determined whether the contents of the code in the second data region Ab are correct or not in the same manner as that in step 170.

If a YES answer is obtained, then the routine proceeds to step 220 wherein the first information element has already been derived by decoding the code in each of the first data regions Aa or not. If a YES answer is obtained, then the routine proceeds to step 230 wherein it is determined whether only the second information element is to be outputted or not. If a NO answer is obtained, then the routine proceeds to step 240 wherein the code content output operation is executed on each of the first and second information elements.

If a NO answer is obtained in step 220 or step 230, then the routine proceeds to step 270 wherein the code content output operation is performed only on the second information element.

If a NO answer is obtained in step 210, then the routine proceeds to step 250 wherein the first information element has already been derived by decoding the code in each of the first data regions Aa or not. If a YES answer is obtained, then the routine proceeds to step 260 wherein the code content output operation is performed only on the first information elements. Alternatively, if a NO answer is obtained, then the routine proceeds to step 280 without performing the code content output operation.

The determination of a location of each data cell in the first and second data regions Aa and Ab may also be made using techniques taught in U.S. Pat. No. 5,691,527 issued Nov. 25, 1997, assigned to the same assignee as that of this application, the disclosure of which is incorporated herein by reference.

The size of the data cells in the first data regions Aa is, as already described, identical to that of the cells of the location symbols 54A to 54C. The size of the data cells in the second data region Ab is one-fourth of that of the cells of the location symbols 54A to 54C. This allows two codes to be provided in the two-dimensional code 52. Specifically, the formation of a plurality of data regions in a single two-dimensional code using different cell sizes allows a plurality of codes to be contained in the two-dimensional code as needed. For instance, automatically sorting articles being conveyed at high speeds may be achieved by attaching the two-dimensional code 52, in which required data is written in the first data regions Aa made up of the data cells of a larger size, to each of the articles and reading it using an optical reader. Additionally, an operator may manually sort articles being conveyed at low speeds or resting if the two-dimensional code 52, in which required data is written in the second data region Aa made up of the data cells of a smaller size, is attached to each of the articles and read using a hand-held optical reader. Specifically, the use of the two-dimensional code 52 as described above allows a plurality of data to be retained in the data regions Aa and Ab made up of the data cells having the smallest possible sizes determined in relation to relative speeds of the two-dimensional code 52 to the optical reader, respectively, without need for adjustment of the size of all cells in the two-dimensional code 52 to the largest one.

The use of the auxiliary symbol 60 in decoding the code in the second data region Ab allows the second information element to be read out of the second data region Ab more accurately than using only the location symbols 54A to 54C even if a captured image of the two-dimensional code 52 is deformed undesirably.

Figure 9A:
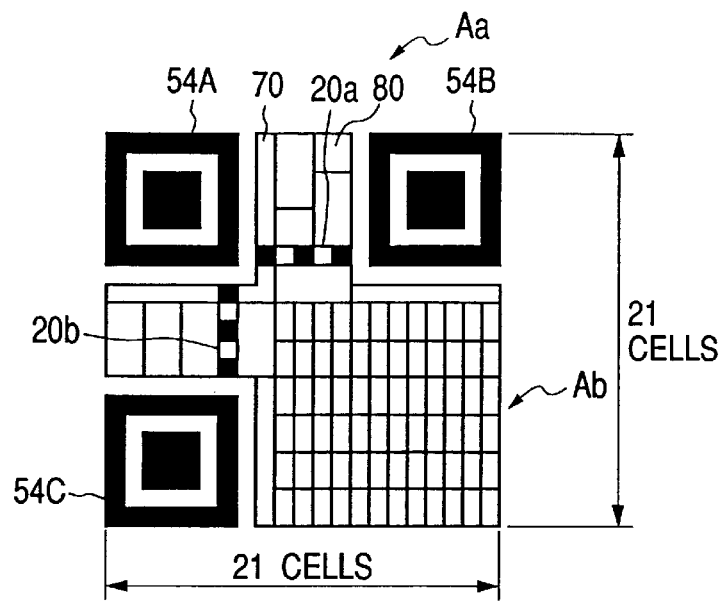
FIG. 9(a) shows a first modification of the two-dimensional code shown in FIG. 3(a)
Figure 9B:
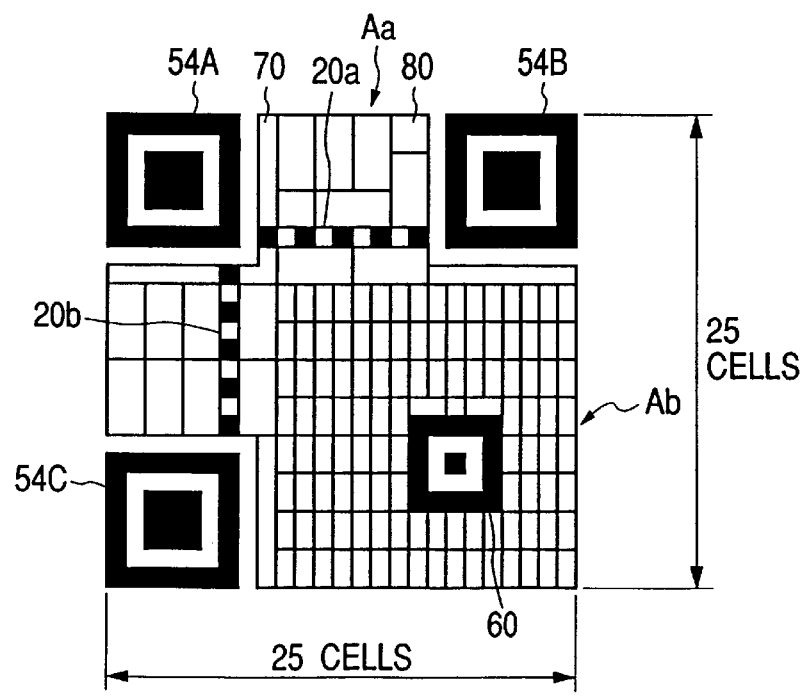
FIG. 9(b) shows a second modification of the two-dimensional code shown in FIG. 3(a)

The two-dimensional code 52 is, as described above, formed with a square matrix of 29×29 cells if one of the data cells in the first data region Aa is defined as a unit; however, it may be formed with another square matrix. For instance, the two-dimensional code 52 may be formed with a square matrix of 21×21 cells, as shown in FIG. 9(a), or a square matrix of 25×25 cells, as shown in FIG. 9(b), if one of the data cells in the first data regions Aa is defined as a unit. In either case, the first data regions Aa are arranged between the location symbols 54A and 54B and between the location symbols 54A and 54C, while the second data region Ab is arranged in the remaining area. The total number of data cells in each of the first and second data regions Aa and Ab is decreased in the order of FIGS. 3(a), 9(b) and 9(a).

The two-dimensional code 52 in FIG. 9(a) has no auxiliary symbol. This is because the overall size thereof is small, so that an error in reading the data cells in the second data region Ab is usually low even if an image of the two-dimensional code 52 is deformed undesirably.

The two-dimensional code 52 may also be formed with a square matrix greater in size than that shown in FIG. 3(a). Usually, the arrangement of the cell groups each consisting of 2×4 cells in the first data regions Aa is classified into a plurality of versions as a function of the overall size of the two-dimensional code 52. In order to specify one of the versions of the arrangement of the cell groups in the first data regions Aa, version symbols 80 may be disposed, as shown in FIGS. 3(a), 9(a), and 9(b), adjacent to the data cells in the first data region Aa between the location symbols 54A and 54B. In this case, the version symbols 80 may be analyzed to know the arrangement of the cell groups in the first data regions Aa prior to decoding the code in the first data regions Aa in step 160 of FIG. 7(a).

Figure 10:
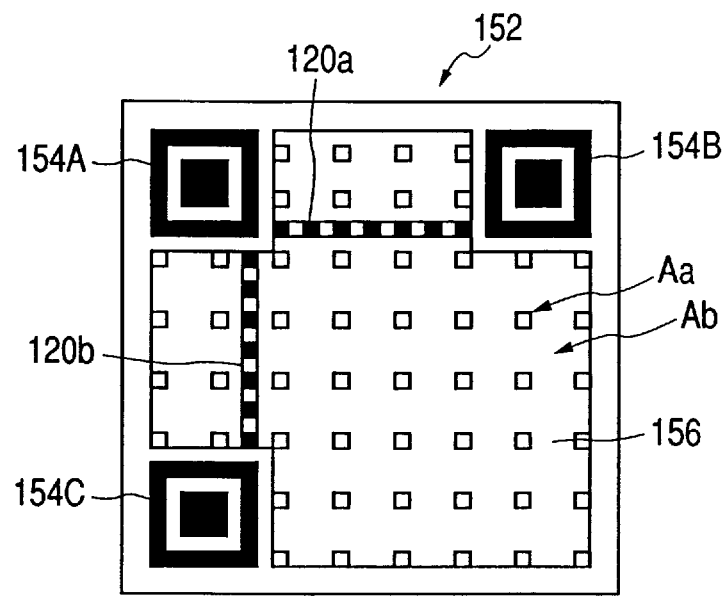
FIG. 10 shows a two-dimensional code according to the second embodiment of the invention.

FIG. 10 shows a two-dimensional code 152 according to the second embodiment of the invention.

The two-dimensional code 152 includes a data field 156 which consists of a plurality of first data regions Aa and a second data region Ab occupying most of the two-dimensional code 152 other than the location symbols 154A, 154B, and 154C. The first data regions Aa are each formed with a smaller matrix of cells and dispersed over the second data region Ab. The decoding of a code represented by data cells in each of the first and second data regions Aa and Ab is achieved in the same manner as that in the first embodiment by analyzing a logical value at the center of each data cell.

Even when the first and second data regions Aa and Ab, like the two-dimensional code 52 in FIG. 3(*a*), are separated from each other, the first data region Aa need not always be arranged between the location symbols 54A and 54B and between the location symbols 54A and 54C. For instance, the first data region Aa may be disposed only between the location symbols 54A and 54B. Alternatively, the second data region Ab may be disposed between the location symbols 54A and 54B and between the location symbols 54A and 54C.

Figure 11:
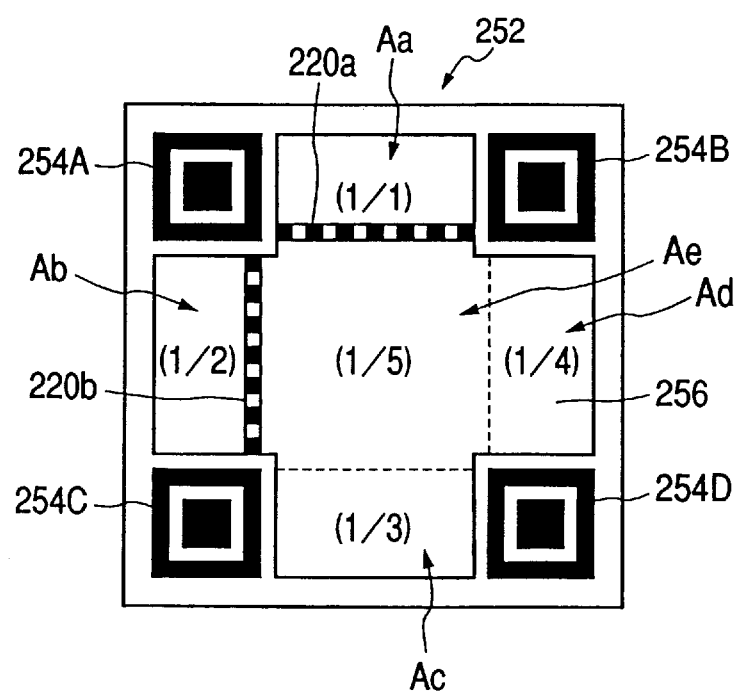
FIG. 11 shows a two-dimensional code according to the third embodiment of the invention.

The size of the data cells in the second data region Ab is, as described above, one-fourth (¼) of that of the cells of each of the location symbols 54A to 54C. In other words, the second data region Ab is made up of the data cells having the same size. The second data region Ab, however, may alternatively be divided into a plurality of sections made up of cells having different sizes, respectively, to carry different data codes. For instance, a two-dimensional code 252, as shown in FIG. 11, may be employed.

The two-dimensional code 252 has location symbols 254A, 254B, 254C, and 254D arranged, one on each of four corners thereof, arrays of timing cells 220*a* and 220*b*, and first to fifth data regions Aa, Ab, Ac, Ad, and Ae defined in a data field 256. The first data region Aa is arranged between the location symbols 254A and 254B and made up of data cells having the same size (⅟₁) as that of cells of each of the location symbols 254A to 254D. The second data region Ab is arranged between the location symbols 254A and 254C and made up of data cells having the size of ½ of that of the cells of each of the location symbols 254A to 254D. The third data region Ac is arranged between the location symbols 254C and 254D and made up of data cells having the size of ⅓ of that of the cells of each of the location symbols 254A to 254D. The fourth data region Ad is arranged between the location symbols 254D and 254B and made up of data cells having the size of ¼ of that of the cells of each of the location symbols 254A to 254D. The fifth data region Ae is arranged in a central area of the two-dimensional code 252 and made up of data cells having the size of ⅕ of that of the cells of each of the location symbols 254A to 254D.

The size of the data cells of each of the first to fifth data regions Aa to Ae is, as apparent from the above, $1/n$ (n=a natural number) of that of the cells of the location symbols 254A to 254D; however, it may be n/m (n, m=natural numbers, m>n) of that of the cells of the location symbols 254A to 254D. The size of the data cells may also be $½^n$ (n=a natural number) of that of the cells of the location symbols 254A to 254D, which is suitable for data processing by a computer.

Data on locations of the first to fifth data regions Aa to Ae, or arrangement thereof in the two-dimensional code 252 may be written in the format code 70 as shown in FIG. 3(*a*). In this case, the format code 70 may be analyzed in step 140 of FIG. 7(*a*) to locate the first to fifth regions Aa to Ae in the two-dimensional code 252.

The format code 70 need not always be provided in a special case where an optical reader is required to read only two-dimensional codes of the same format. This is because it is possible to specify the locations of the first to fifth data regions Aa to Ae in the two-dimensional code 252 by installing a program exclusive to the single format in the optical reader.

The version symbols 80 may be contained in the format code 70. For example, some of the cell groups in the first data regions Aa of the two-dimensional code, as shown in FIG. 3(*a*), 9(*a*), or 9(*b*), unlike the second data region Ab made up of the data cells whose size is smaller than that of the data cells in the first data region Aa, are oriented in a direction different from that of the other cell groups. It is, therefore, possible to specify a geometrical pattern of the cell groups over the first data region Aa as a function of a difference in size between the first and second data regions Aa and Ab. Therefore, data on the geometrical pattern of the cell groups in the first data region Aa or data indicating only that the geometrical pattern of the cell groups in the first data region Aa is different from that of the cell groups in the second data region Ab may be contained in the format code 70 as part of format information on of the two-dimensional code.

Figure 12:
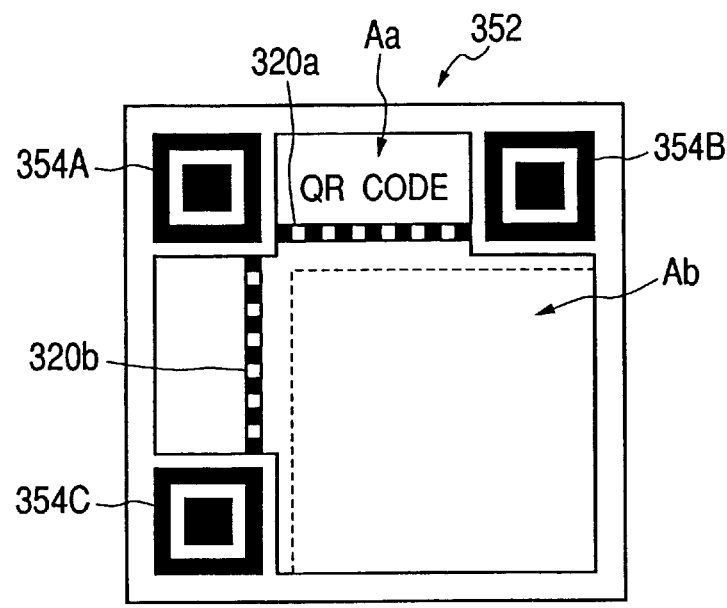
FIG. 12 shows a two-dimensional code according to the fourth embodiment of the invention.

The first and second information elements held in the first and second data regions Aa and Ab discussed so far are represented by the same type of code. For example, each of the first and second information elements in the two-dimensional code 52 in FIG. 3(*a*) is represented by the QR code (Trademark). The two-dimensional codes in the above embodiments are, however, not limited to use of the same type of code in representing the first and second information elements. For example, the first information in each of the first data regions Aa may be represented by the QR code, while the second information element in the second data region Ab may be expressed in a different type of code such as a CP code (Trademark). This is illustrated in FIG. 12. The two-dimensional code 352 has two arrays of timing cells 320*a* and 320*b* printed thereon. The array of timing cells 320*a* is used to locate data cells in the first data region Aa between the location symbols 354A and 354B. The array of timing cells 320*b* is used to locate data cells in the first data region Aa between the location symbols 354A and 354C. In the case of the two-dimensional code 252 shown in FIG. 11, five different codes may be employed, one in each of the first to fifth data regions Aa to Ae. In this case, it is advisable that data on the location and the type of code used in each of the first to fifth data regions Aa to Ae be contained in the format code 70 and that a program be installed in the optical reader 2 shown in FIG. 5 which is used in decoding each of the codes in the first to fifth data regions Aa to Ae according to a corresponding decoding algorithm.

Figure 13:
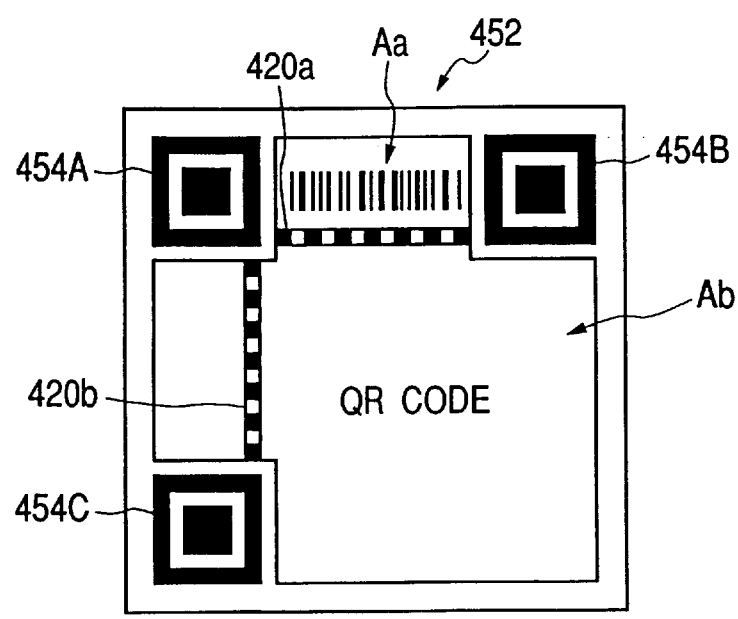
FIG. 13 shows a two-dimensional code according to the fifth embodiment of the invention.

Further, the first information element in one of the first data regions may be, as shown in FIG. 13, represented by a bar code, while the second information element in the second data region Ab may be represented by the QR code. The two-dimensional code 452 has two arrays of timing cells 420*a* and 420*b* printed between the location symbols 454A and 454B and between the location symbols 454A and 454C, respectively. Both the arrays of timing cells 420*a* and 420*b* are used to locate data cells in an area other than the first data region Aa between the location symbols 454A and 454B.

The first and second information elements may be employed for management of commodities on sale and stored in a shop, respectively.

In the above case where the first and second information elements are represented by different types of code, it is advisable that data for discriminating between the types of code used in the first and second data regions Aa and Ab be contained in the format code 70.

Figure 14A:
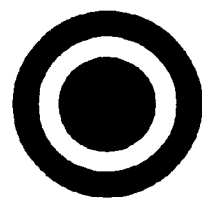
FIGS. 14(a), 14(b), and 14(c) show modifications of a location symbol.
Figure 14B:
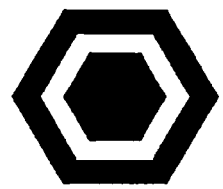
Figure 14C:
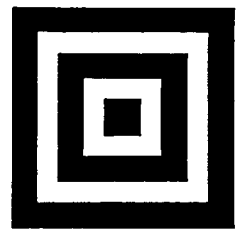

While in the above embodiments, each location symbol is formed with double black squares to show an optical pattern, whose frequency component ratio of dark:light:dark:light:dark=1:1:3:1:1, captured along a scanning line passing through the center thereof, it may have a geometrical pattern defined by similar figures arranged coaxially such as circles, as shown in FIG. 14(a), or hexagons, as shown in FIG. 14(b). Additionally, a geometrical pattern, as shown in FIG. 14(c), defined by more than two similar figures arranged coaxially, exhibiting the same frequency component ratio in every direction may be used. Further, an external form of the two-dimensional code may be rectangular. The auxiliary symbol 60 may also be formed with either of the ones shown in FIGS. 14(a) to 14(c).

In the above embodiments, each location symbol is arranged at one of corners of the two-dimensional code, however, it may be provided at any location. Four or more location symbols may also be arranged in any location in the two-dimensional code. Alternatively, two location symbols may be printed on the two-dimensional code. In this case, the location of the data field may be determined either by arranging the location symbols at two opposed corners of the two-dimensional code or by arranging the location symbols at two adjacent corners of the two-dimensional code and using the positional relation between the location symbols and the auxiliary symbol 60. Further, a single location symbol may be printed at any location in the two-dimensional code. In this case, the location of each data cell may be specified by using positional relations to the location symbol and the auxiliary symbol 60.

The location of the auxiliary symbol 60 is, as described above, determined through a mathematical calculation using the positional relations to the location symbols 54A to 54C; however, it may be determined using the ratio detecting circuit 20 in the same manner as that used in determining the location of each location symbol. The location of each location symbol may alternatively be determined mathematically in the same manner as that used in determining the location of the auxiliary symbol 60.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A two-dimensional code comprising:
a matrix of cells arranged in an optically readable pattern to carry information;
location symbols arranged at predetermined locations in said matrix, each of said location symbols comprising a predetermined number of cells arranged in a pattern to carry location data, the location data specifying a location of the two-dimensional code; and
a data field defined in said matrix, the data field including a first and a second data region to respectively carry a first and a second information element, the first data region comprising a first number of cells having a size identical to that of the cells of said location symbols and defined between said location symbols, the second data region comprising a second number of cells having a size smaller than that of the cells in the first data region.

2. The two-dimensional code as set forth in claim 1, wherein the second data region includes a plurality of sections which comprise predetermined numbers of cells having different sizes, and which carry information elements.

3. The two-dimensional code as set forth in claim 1, wherein the first information element is represented by a code of a type specified by the location symbols, and the second information element is represented by a code of a type different from that of the first information element.

4. The two-dimensional code as set forth in claim 3, wherein the second data region includes a plurality of sections which comprise predetermined numbers of cells having different sizes, and which carry a plurality of different information elements that are represented by codes different in type from each other and the first information element.

5. The two-dimensional code as set forth in claim 1, further comprising a format code which is arranged in a preselected positional relation to the location symbols and which indicates a format of the two-dimensional code.

6. The two-dimensional code as set forth in claim 5, wherein said format code comprises a predetermined number of cells arranged in a preselected optical pattern.

7. The two-dimensional code as set forth in claim 5, wherein said format code carries data to specify at least one of a location of each of the first and second data regions, a type of code used in each of the first and second data regions, and a size of the cells in each of the first and second data regions.

8. The two-dimensional code as set forth in claim 5, wherein said format code holds classification information and version information, the classification information representing one of preselected combinations of locations of the first and second data regions, types of code used in the first and second data regions, and sizes of the cells in the first and second data regions, the version information specifying a geometrical pattern of the first data region as a function of a difference in cell size between the first and second data regions.

9. The two-dimensional code as set forth in claim 5, wherein said format code is arranged adjacent to one of the location symbols.

10. The two-dimensional code as set forth in claim 1, further comprising an auxiliary symbol to determine locations of the cells in the second data region based on an optical pattern of said auxiliary symbol and locations of the location symbols.

11. A method of reading a two-dimensional code, comprising:
capturing an image of a two-dimensional code, the two-dimensional code including a matrix of cells arranged in an optically readable pattern to carry information, location symbols arranged at predetermined locations in said matrix, each of said location symbols comprising a predetermined number of cells arranged in a pattern to carry location data, the location data specifying a location of the two-dimensional code, and a data field defined in said matrix, the data field including a first and a second data region having data codes to respectively carry a first and a second information element, the first data region comprising a first number of cells having a size identical to that of the cells of said location symbols and defined between said location symbols, the second data region comprising a second number of cells having a size smaller than that of the cells in the first data region, the image capturing determining locations of the location symbols in the image;

determining a location of each of the cells in at least one of the first and second data regions based on the locations of the location symbols and the size of the cells in the one of the first and second data regions; and decoding a corresponding one of the data codes in the at least one of the first and second data regions to produce a corresponding one of the first and second information elements based on the cells whose locations are determined.

12. The method as set forth in claim 11, wherein the second data region includes a plurality of sections which comprise predetermined numbers of cells having different sizes to represent data codes which carry a plurality of information elements.

13. The method as set forth in claim 11, wherein the data code of the first information element is of a type specified by the location symbols, and the data code of the second information element is of a type different from that of the first information element, and wherein said decoding decodes the one of the data codes using a decoding algorithm corresponding to the type of the one of the data codes.

14. The method as set forth in claim 13, wherein the second data region includes a plurality of sections which comprise predetermined numbers of cells having different sizes, and which carry different information elements that are represented by data codes different in type from each other and the first information element.

15. The method as set forth in claim 13, wherein said two-dimensional code further includes a format code which is arranged in a preselected positional relation to the location symbols and which carries format information on the two-dimensional code representing locations of the first and second data regions, the sizes of the cells in the first and second data regions, and the types of data codes used in the first and second data regions, and further comprising locating the format code based on the locations of the location symbols to analyze the format information on the two-dimensional code, and wherein said location determining determines the location of each of the cells based on the format information, and said decoding decodes the one of the data codes using a decoding algorithm corresponding to the type of the one of the data codes specified by the format information.

16. The method as set forth in claim 11, wherein said two-dimensional code further includes a format code which is arranged in a preselected positional relation to the location symbols and which carries format information on the two-dimensional code representing locations of the first and second data regions and the sizes of the cells in the first and second data regions, and further comprising locating the format code based on the locations of the location symbols to analyze the format information on the two-dimensional code, and wherein said location determining determines the location of each of the cells based on the format information.

17. The method as set forth in claim 11, wherein the two-dimensional code further includes an auxiliary symbol which is disposed at a location away from the location symbols, and further comprising determining the location of the auxiliary symbol in the image based on the locations of the location symbols and an optical pattern of the auxiliary symbol, and wherein said location determining determines the location of each of the cells in the at least one of the first and second data regions based on the locations of the auxiliary symbol and the location symbols and the size of the cells in the one of the first and second data regions.

18. A software product stored on a computer readable medium containing instructions for execution by a processor, the instructions, when executed:

capturing an image of a two-dimensional code, the two-dimensional code including a matrix of cells arranged in an optically readable pattern to carry information, location symbols arranged at predetermined locations in said matrix, each of said location symbols comprising a predetermined number of cells arranged in a pattern to carry location data, the location data specifying a location of the two-dimensional code, and a data field defined in said matrix, the data field including a first and a second data region having data codes to respectively carry a first and a second information element, the first data region comprising a first number of cells having a size identical to that of the cells of said location symbols and defined between said location symbols, the second data region comprising a second number of cells having a size smaller than that of the cells in the first data region, the image capturing determining locations of the location symbols in the image;

determining a location of each of the cells in at least one of the first and second data regions based on the locations of the location symbols and the size of the cells in the one of the first and second data regions; and decoding a corresponding one of the data codes in the at least one of the first and second data regions to produce a corresponding one of the first and second information elements based on the cells whose locations are determined.

* * * * *